United States Patent
Handlin, Jr. et al.

(10) Patent No.: US 7,267,855 B2
(45) Date of Patent: *Sep. 11, 2007

(54) ARTICLES PREPARED FROM HYDROGENATED CONTROLLED DISTRIBUTION BLOCK COPOLYMERS

(75) Inventors: Dale Lee Handlin, Jr., Houston, TX (US); Carl Lesley Willis, Houston, TX (US); Margaret Ann Burns Clawson, Houston, TX (US); Hendrik de Groot, Ottignies Louvain-La Neuve (BE); Keith Edward Eiden, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/359,907

(22) Filed: Feb. 6, 2003

(65) Prior Publication Data

US 2003/0181585 A1    Sep. 25, 2003

Related U.S. Application Data

(63) Continuation of application No. 10/209,285, filed on Jul. 31, 2002, now abandoned.

(60) Provisional application No. 60/355,210, filed on Feb. 7, 2002.

(51) Int. Cl.
    *C08L 53/02*    (2006.01)
(52) U.S. Cl. .................. 428/34.1; 428/221; 428/521; 525/88; 525/89; 525/271; 525/338; 525/98
(58) Field of Classification Search .............. 428/34.1, 428/221, 521; 525/88, 89, 98, 271, 338
See application file for complete search history.

(56) References Cited

U.S. PATENT DOCUMENTS

| | | | |
|---|---|---|---|
| 2,975,160 A | 3/1961 | Zelinski |
| 3,149,182 A | 9/1964 | Porter |
| RE27,145 E | 6/1971 | Jones |
| 3,595,942 A | 7/1971 | Wald et al. |
| 3,600,250 A | 8/1971 | Evans |
| 3,634,549 A | 1/1972 | Shaw et al. |
| 3,670,054 A | 6/1972 | De La Mare et al. |
| 3,700,633 A | 10/1972 | Wald et al. |
| 4,073,831 A | 2/1978 | Tabana et al. |
| 4,089,913 A | 5/1978 | Miki et al. |
| 4,107,131 A | 8/1978 | Gergen et al. |
| 4,122,134 A | 10/1978 | Miki et al. |
| 4,267,284 A | 5/1981 | Kitchen |
| 4,367,325 A | 1/1983 | Takeuchi et al. |
| 4,412,087 A | 10/1983 | Trepka |
| 4,547,560 A | 10/1985 | Hattori et al. |
| 4,578,429 A | 3/1986 | Gergen et al. |
| 4,603,155 A | 7/1986 | Muramori et al. |
| 4,898,914 A | 2/1990 | Gergen et al. |
| H790 H | 6/1990 | Gergen et al. |
| 4,970,265 A | 11/1990 | Willis |
| 5,075,377 A | 12/1991 | Kawabuchi et al. |
| 5,191,024 A | 3/1993 | Shibata et al. |
| 5,206,300 A | 4/1993 | Chamberlain |
| 5,276,101 A | 1/1994 | Chamberlain et al. |
| 5,290,875 A | 3/1994 | Moczygemba et al. |
| 5,306,779 A | 4/1994 | Shibata et al. |
| 5,336,737 A | 8/1994 | van Ballegooijen et al. |
| 5,346,964 A | 9/1994 | Shibata et al. |
| 5,506,299 A | 4/1996 | Gelles et al. |
| 5,516,831 A | 5/1996 | Pottick et al. |
| 5,545,690 A | 8/1996 | Trepka et al. |
| 5,603,155 A | 2/1997 | Satomi et al. |
| 5,910,546 A | 6/1999 | Trepka et al. |
| 5,972,519 A | 10/1999 | Niessner et al. |
| 6,031,053 A | 2/2000 | Knoll et al. |
| 6,107,411 A | 8/2000 | Toya et al. |
| 6,197,889 B1 | 3/2001 | Knoll et al. |
| 6,235,847 B1 | 5/2001 | Hoshi et al. |
| 6,265,484 B1 | 7/2001 | Trepka et al. |
| 6,265,485 B1 | 7/2001 | Trepka et al. |
| 6,346,572 B1 | 2/2002 | Loth et al. |
| 6,395,841 B1 | 5/2002 | Calverley et al. |
| 6,521,712 B1 | 2/2003 | Knoll et al. |
| 6,593,430 B1 | 7/2003 | Knoll et al. |

(Continued)

FOREIGN PATENT DOCUMENTS

EP        0 492 490 B1    8/1996

(Continued)

OTHER PUBLICATIONS

Yih-Chau Lin, et al.: "Using Heavy Ethers as Structure Modifiers in the Synthesis of SBS Block Copolymers in Cyclohexane" Journal of Applied Polymer Science, John Wiley and Sons, Inc., New York, New York, US, vol. 64, No. 13, Jun. 27, 1997, pp. 2543-2560.

*Primary Examiner*—Jeffrey Mullis
(74) *Attorney, Agent, or Firm*—Dean F Vance; Keith M. Tackett; Michael A. Masse

(57) ABSTRACT

The present invention relates to articles prepared from novel anionic block copolymers of mono alkenyl arenes and conjugated dienes, and to blends of such block copolymers with other polymers. The block copolymers are selectively hydrogenated and have mono alkenyl arene end blocks and controlled distribution blocks of mono alkenyl arenes and conjugated dienes. The block copolymer may be blended with at least one other polymer selected from the group consisting of olefin polymers, styrene polymers, amorphous resins and engineering thermoplastic resins.

55 Claims, No Drawings

U.S. PATENT DOCUMENTS

| | | | |
|---|---|---|---|
| 6,759,454 B2* | 7/2004 | Stephens et al. | |
| 7,001,956 B2* | 2/2006 | Handlin et al. | 525/342 |
| 7,067,589 B2 | 6/2006 | Bening et al. | |
| 2003/0149140 A1 | 8/2003 | Stephens et al. | |
| 2003/0153681 A1 | 8/2003 | St. Clair et al. | |
| 2003/0166776 A1* | 9/2003 | Wright et al. | 525/88 |
| 2003/0176574 A1* | 9/2003 | St. Clair et al. | 525/88 |
| 2003/0176582 A1* | 9/2003 | Bening et al. | 525/242 |
| 2003/0181584 A1 | 9/2003 | Handlin et al. | |
| 2003/0181585 A1 | 9/2003 | Handlin et al. | |
| 2003/0225209 A1* | 12/2003 | Handlin et al. | 525/88 |
| 2004/0072951 A1* | 4/2004 | Hansen et al. | 525/89 |
| 2004/0138371 A1* | 7/2004 | St. Clair et al. | 524/505 |
| 2005/0137346 A1* | 6/2005 | Bening et al. | 525/314 |
| 2005/0137347 A1* | 6/2005 | Bening et al. | 525/314 |
| 2005/0137348 A1* | 6/2005 | Bening et al. | 525/314 |
| 2005/0137349 A1* | 6/2005 | Bening et al. | 525/314 |
| 2005/0137350 A1* | 6/2005 | Bening et al. | 525/314 |
| 2005/0171290 A1* | 8/2005 | Bening et al. | 525/314 |

FOREIGN PATENT DOCUMENTS

| | | |
|---|---|---|
| EP | 0 796 871 | 9/1997 |
| EP | 0 808 342 | 11/1997 |
| EP | 0 822 227 | 2/1998 |
| EP | 0 877 038 A2 | 11/1998 |
| EP | 0 878 492 | 11/1998 |
| EP | 0 879 836 | 11/1998 |
| EP | 0 654 488 B1 | 1/1999 |
| EP | 0 398 758 B1 | 3/1999 |
| EP | 0 859 803 B1 | 12/1999 |
| EP | 0 927 210 B1 | 6/2000 |
| EP | 0 766 706 B1 | 12/2001 |
| GB | 2 138 009 A | 10/1984 |
| JP | 60-163910 | 8/1985 |
| JP | 61-291610 | 12/1986 |
| JP | 6-271717 | 9/1994 |
| JP | 7-149952 | 6/1995 |
| WO | 00/58380 | 10/2000 |

* cited by examiner

US 7,267,855 B2

ARTICLES PREPARED FROM HYDROGENATED CONTROLLED DISTRIBUTION BLOCK COPOLYMERS

Cross-Reference to Related Applications

The present application claims the benefit U.S. Provisional Patent Application Ser. No. 60/355,210, filed Feb. 7, 2002, entitled Novel Block Copolymers and Method for Making Same and the present application is a continuation of U.S. patent application Ser. No. 10/209,285 filed Jul. 31, 2002, entitled Elastomeric Articles Prepared from Controlled Distribution Block Copolymers, now abandoned.

The present application is related to commonly assigned U.S. patent application Ser. No. 10/359,981 entitled Novel Block Copolymers and Method for Making Same, now published as US2003/0176582 A1, commonly assigned U.S. patent application Ser. No. 10/359,906 entitled Polymer Modified Bitumen Compositions, now U.S. Pat. No. 6,759,454, copending, commonly assigned U.S. patent application Ser. No. 10/359,927 entitled Adhesives and Sealants From Controlled Distribution Block Copolymers, now published as US2003/0176574 A1, copending, commonly assigned U.S. patent application Ser. No. 10/359,953 entitled Articles Prepared From Controlled Distribution Block Copolymers, now published as US2003/0166776 A1, copending, commonly assigned U.S. patent application Ser. No. 10/359,462 entitled Gels From Controlled Distribution Block Copolymers, now published as US2003/0153681 A1, all of which were filed Feb. 6, 2003 and copending, commonly assigned International Patent Application Ser. No. PCT/NL03/00098 filed on Feb. 7, 2003 entitled Solvent-Free, Hot Melt Adhesive Composition Comprising a Controlled Distribution Block Copolymer, now published as WO 03/066769 A1, commonly assigned U.S. patent application Ser. No. 10/745,352 filed Dec. 12, 2003, entitled Gels from Controlled Distribution Block Copolymers, now published as US2004/0138371 A1, which is a continuation-in-part of U.S. patent application Ser. No. 10/359,462, commonly assigned U.S. patent application Ser. No. 10/681,608 filed Oct. 8, 2003 entitled Photopolymerizable Compositions and Flexographic Printing Plates Prepared from Controlled Distribution Block Copolymers, now published as US2004/0072951, all of which claim the benefit of U.S. Provisional Patent Application Ser. No. 60/355,210 filed Feb. 7, 2002.

BACKGROUND OF THE INVENTION

1. Field of the Invention

This invention relates to articles prepared from novel anionic block copolymers of mono alkenyl arenes and conjugated dienes, and to blends of such block copolymers with other polymers. The invention also relates to formed articles and methods for forming articles from such novel block copolymers.

2. Background of the Art

The preparation of block copolymers of mono alkenyl arenes and conjugated dienes is well known. One of the first patents on linear ABA block copolymers made with styrene and butadiene is U.S. Pat. No. 3,149,182. These polymers in turn could be hydrogenated to form more stable block copolymers, such as those described in U.S. Pat. No. 3,595,942 and U.S. Pat. No. Re. 27,145. Since then, a large number of new styrene diene polymers have been developed.

SUMMARY OF THE INVENTION

In one aspect of the present invention we have discovered that a novel composition comprising at least one hydrogenated block copolymer having a controlled distribution block of a mono alkenyl arene and conjugated diene, and optionally including another polymer, has superior properties for many applications. We have also discovered that these compositions can be used in various forming processes, and that they also have a number of advantages in processing.

Accordingly, the broad aspect of the present invention is an article comprising at least one hydrogenated block copolymer and, optionally, at least one other component selected from the group consisting of olefin polymers, styrene polymers, tackifying resins, polymer extending oils and engineering thermoplastic resins, wherein said hydrogenated block copolymer has at least one A block and at least one B block and wherein (a.) prior to hydrogenation each A block is a mono alkenyl arene homopolymer block and each B block is a controlled distribution copolymer block of at least one conjugated diene and at least one mono alkenyl arene; (b.) subsequent to hydrogenation about 0-10% of the arene double bonds have been reduced, and at least about 90% of the conjugated diene double bonds have been reduced; (c.) each A block having an average molecular weight between about 3,000 and about 60,000 and each B block having an average molecular weight between about 30,000 and about 300,000; (d.) each B block comprises terminal regions adjacent to the A blocks that are rich in conjugated diene units and one or more regions not adjacent to the A blocks that are rich in mono alkenyl arene units; (e.) the total amount of mono alkenyl arene in the hydrogenated block copolymer is about 20 percent weight to about 80 percent weight; and (f.) the weight percent of mono alkenyl arene in each B block is between about 10 percent and about 75 percent.

In another aspect of the present invention we have shown that the article can be formed in a wide variety of processes, including injection molding, compression molding, over molding, dipping, extrusion, roto molding, slush molding, fiber spinning, blow molding, polymer modification, cast film making, blown film making and foaming.

In still another aspect of the present invention, the hydrogenated controlled distribution polymer of the present invention may be functionalized in a variety of ways, including reaction with maleic acid or anhydride. Such functionalized polymers have additional polarity that makes them particularly useful where adhesion to other polar polymers is important, such as in over molding applications.

The articles of the present invention have a number of surprising properties. These properties include, for example, the unusual stress-strain response, which shows that a composition of the present invention exhibits a stiffer rubbery response to strain, therefore requiring more stress to extend the same length. This is an extremely useful property that allows the use of less material to achieve the same force in a given product. Elastic properties are also modified, exhibiting increasing modulus with increasing elongation, and there is a reduced occurrence of the rubbery plateau region where large increases in elongation are required to procure an increase in stress. Another surprising property is reduced coefficient of friction while retaining elastomeric properties. This is important for applications where a soft material is desired without a high friction surface. Still another surprising property is increased tear strength.

The controlled distribution copolymers of the present invention offer additional advantages in their ability to be easily processed using equipment generally designed for processing thermoplastic polystyrene, which is one of the most widely known and used alkenyl arene polymers. Melt processing can be accomplished via extrusion or injection molding using either single screw or twin screw techniques that are common to the thermoplastics industry. Solution or spin casting techniques can also be used as appropriate. A particularly interesting application is in over molding where a composition containing the controlled distribution block copolymer and optionally other thermoplastic polymers and process aides are injection molded onto a substrate of a more rigid polymer to impart a softer feel or different frictional characteristics. The polymers of the present invention provide improved adhesion to polar polymers. Adhesion to very polar materials such as polyamides or polyurethanes may be further improved by functionalizing the polymer of the present invention, for example with maleic anhydride.

In yet another aspect of the present invention, the article can be processed into the form of a film, sheet, multi layer laminate, coating, band, strip, profile, molding, foam, tape, fabric, thread, filament, ribbon, fiber, plurality of fibers, or fibrous web. Another particularly interesting application is thermoplastic films which retain the processability of styrenic block copolymers but exhibit a higher "elastic power" similar to spandex polyurethanes. As compounded with polyethylene or with a combination of tackifying resin and polyethylene, the controlled distribution copolymers of the present invention can meet these performance expectations. The resultant films show significant improvements in puncture resistance and strength, and reduced viscosity, when compared with common styrene/ethylene-butylene block copolymers. The same controlled distribution styrene/hydrogenated butadiene copolymer can also be formulated in a film compound with oil and polystyrene, wherein it exhibits higher strength and improved energy recovery and transparency in comparison with a control formulation based on a styrene/ethylene-butylene/styrene block copolymer. Molding applications formulated using oil and polypropylene have a reduced viscosity and coefficient of friction, and may be used in applications such as cap seals. It should also be possible to produce such cap seals without using undesirable slip agents.

Finally, the copolymers of the present invention can be compounded with other components not adversely affecting the copolymer properties. Exemplary materials that could be used as additional components would include, without limitation, pigments, antioxidants, stabilizers, surfactants, waxes, and flow promoters. The polymers of the present invention are useful in a wide variety of applications including, for example, molded and extruded goods such as toys, grips, handles, shoe soles, tubing, sporting goods, sealants, gaskets, and oil gels. The compositions also find use as rubber toughening agents for polyolefins, polyvinyl chloride, polystyrene, polyamide, polyurethane, polyester, polycarbonate and epoxy resins. The polymers of the present invention are also useful in alloys and blends, and as compatibilizers for a variety of polymers and other materials. Improved elasticity when compared with conventional styrenic block copolymers makes these copolymers particularly useful for adhesives, including both pressure-sensitive and hot-melt adhesives.

DETAILED DESCRIPTION OF THE PREFERRED EMBODIMENTS

The key component of the present invention is the novel block copolymer containing mono alkenyl arene end blocks and a unique mid block of a mono alkenyl arene and a conjugated diene. Surprisingly, the combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. For purposes hereof, "controlled distribution" is defined as referring to a molecular structure having the following attributes: (1) terminal regions adjacent to the mono alkenyl arene homopolymer ("A") blocks that are rich in (i.e., have a greater than average amount of) conjugated diene units; (2) one or more regions not adjacent to the A blocks that are rich in (i.e., have a greater than average amount of) mono alkenyl arene units; and (3) an overall structure having relatively low blockiness. For the purposes hereof, "rich in" is defined as greater than the average amount, preferably greater than 5% the average amount. This relatively low blockiness can be shown by either the presence of only a single ("Tg,") intermediate between the Tg's of either monomer alone, when analyzed using differential scanning calorimetry ("DSC") (thermal) methods or via mechanical methods, or as shown via proton nuclear magnetic resonance ("H-NMR") methods. The potential for blockiness can also be inferred from measurement of the UV-visible absorbance in a wavelength range suitable for the detection of polystyryl-lithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows:

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, *High Resolution NMR of Macromolecules* (Academic Press, New York and London, 1972), chapter 6.

The styrene blockiness is simply the percentage of blocky styrene to total styrene units:

Blocky %=100 times (Blocky Styrene Units/Total Styrene Units)

Expressed thus, Polymer-Bd-S-(S)n-S-Bd-Polymer, where n is greater than zero is defined to be blocky styrene. For example, if n equals 8 in the example above, then the blockiness index would be 80%. It is preferred that the blockiness index be less than about 40. For some polymers, having styrene contents of ten weight percent to forty weight percent, it is preferred that the blockiness index be less than about 10.

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately constituted controlled distribution copolymer region will tend to improve flow and processability. Modification of certain other properties is also achievable.

In a preferred embodiment of the present invention, the subject controlled distribution copolymer block has three distinct regions—conjugated diene rich regions on the end of the block and a mono alkenyl arene rich region near the middle or center of the block. Typically the region adjacent to the A block comprises the first 15 to 25% of the block and comprises the diene rich region(s), with the remainder considered to be arene rich. The term "diene rich" means that the region has a measurably higher ratio of diene to arene than the arene rich region. What is desired is a mono alkenyl arene/conjugated diene controlled distribution copolymer block, wherein the proportion of mono alkenyl arene units increases gradually to a maximum near the middle or center of the block (when describing an ABA structure) and then decreases gradually until the polymer block is fully polymerized. This structure is distinct and different from the tapered and/or random structures discussed in the prior art.

Starting materials for preparing the novel controlled distribution copolymers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

As used herein, "thermoplastic block copolymer" is defined as a block copolymer having at least a first block of a mono alkenyl arene, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be either a di-block, tri-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_nX$ or $(A-B-A)_nX$, or both types of structures can be combined in a mixture. Some A-B diblock polymer can be present but preferably at least about 70 weight percent of the block copolymer is A-B-A or radial (or otherwise branched so as to have 2 or more terminal resinous blocks per molecule) so as to impart strength. Other structures include $(A-B)_n$ and $(A-B)_nA$. In the above formulas, n is an integer from 2 to about 30, preferably 2 to about 15, more preferably 2 to 6 and X is the remnant or residue of the coupling agent.

It is also important to control the molecular weight of the various blocks. For an AB diblock, desired block weights are 3,000 to about 60,000 for the mono alkenyl arene A block, and 30,000 to about 300,000 for the controlled distribution conjugated diene/mono alkenyl arene B block. Preferred ranges are 5000 to 45,000 for the A block and 50,000 to about 250,000 for the B block. For the triblock, which may be a sequential ABA or coupled $(AB)_2$ X block copolymer, the A blocks should be 3,000 to about 60,000, preferably 5000 to about 45,000, while the B block for the sequential block should be about 30,000 to about 300,000, and the B blocks (two) for the coupled polymer half that amount. The total average molecular weight for the triblock copolymer should be from about 40,000 to about 400,000, and for the radial copolymer from about 60,000 to about 600,000. These molecular weights are most accurately determined by light scattering measurements, and are expressed as number average molecular weights.

Another important aspect of the present invention is to control the microstructure or vinyl content of the conjugated diene in the controlled distribution copolymer block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis, preferably about 30 to about 80 mol percent of the condensed butadiene units should have 1,2-vinyl configuration. This is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

For the controlled distribution or B block the weight percent of mono alkenyl arene in each B block is between about 10 weight percent and about 75 weight percent, preferably between about 25 weight percent and about 50 weight percent.

An important feature of the thermoplastic elastomeric di-block and tri-block polymers of the present invention, including one or more controlled distribution diene/alkenyl arene copolymer blocks and one or more mono alkenyl arene blocks, is that they have at least two Tg's, the lower being the single Tg of the controlled distribution copolymer block which is an intermediate of its constituent monomers'Tg's. Such Tg is preferably at least above about −60 degrees C., more preferably from about −40 degrees C. to about +30 degrees C., and most preferably from about −40 degrees C. to about +10 degrees C. The second Tg, that of the mono alkenyl arene "glassy" block, is preferably more than about +80 degrees C., more preferably from about +80 degrees C. to about +110 degrees C. The presence of the two Tg's, illustrative of the microphase separation of the blocks, contributes to the notable elasticity and strength of the material in a wide variety of applications, and its ease of processing and desirable melt-flow characteristics.

The block copolymer is selectively hydrogenated. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and U.S. Pat. No. Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

In an alternative, the block copolymer of the present invention may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al, U.S. Pat. No. 4,578,429 and in U.S. Pat. No. 5,506,299. In another manner the selectively hydrogenated block copolymer of the present invention may be functionalized by grafting silicon or boron containing compounds to the polymer as taught in U.S. Pat. No. 4,882,384. In still another manner, the block copolymer of the present invention may be contacted with an alkoxy-silane compound to form silane-modified block copolymer. In yet another manner, the block copolymer of the present invention may be functionalized by grafting at least one ethylene oxide molecule to the polymer as taught in U.S. Pat. No. 4,898,914, or by reacting the polymer with carbon dioxide as taught in U.S. Pat. No. 4,970,265. Still further, the block copolymers of the present invention may be metallated as taught in U.S. Pat. Nos. 5,206,300 and 5,276,101, wherein the polymer is contacted with an alkali metal alkyl, such as a lithium alkyl. And still further, the block copolymers of the present invention may be functionalized by grafting sulfonic groups to the polymer as taught in U.S. Pat. No. 5,516,831.

One of the surprising compositions of the present invention is the combination of the hydrogenated block copolymer and a polymer extending oil. While in the absence of oil, these polymers exhibit a stiffer elastomeric behavior than a traditional triblock polymer, in the presence of oil, they exhibit a softer elastomeric behavior Especially preferred are the types of oil that are compatible with the elastomeric segment of the block copolymer. While oils of higher aromatics content are satisfactory, those petroleum-based white oils having low volatility and less than 50% aromatic content are preferred. Typical paraffinic processing oils can be used to soften and extend polymers of the present invention; however, processing oils with a higher naphthenic content are more compatible with the controlled distribution rubber block. Processing oils with a naphthenic content between 40% and 55% and an aromatic content less than 10% are preferred. The oils should additionally have low volatility, preferable having an initial boiling point above about 500° F. The amount of oil employed varies from about 0 to about 300 parts by weight per hundred parts by weight rubber, or block copolymer, preferably about 20 to about 150 parts by weight.

The block copolymers of the present invention may be blended with a large variety of other polymers, including olefin polymers, styrene polymers, tackifying resins, and engineering thermoplastic resins.

In addition, the controlled distribution polymers of the present invention may be blended with conventional styrene/diene and hydrogenated styrene/diene block copolymers, such as the styrene block copolymers available from KRATON Polymers. These styrene block copolymers include linear S-B-S, S-I-S, S-EB-S, S-EP-S block copolymers. Also included are radial block copolymers based on styrene along with isoprene and/or butadiene and selectively hydrogenated radial block copolymers.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene and styrene/olefin copolymers. Representative styrene/olefin copolymers are substantially random ethylene/styrene copolymers, preferably containing at least 20, more preferably equal to or greater than 25 weight percent copolymerized styrene monomer.

Also included are styrene-grafted polypropylene polymers, such as those offered under the tradename Interloy®, originally developed by Himont, Inc. (now Basell).

For the purposes of the specification and claims, the term "engineering thermoplastic resin" encompasses the various polymers found in the classes listed in Table A below, and further defined in U.S. Pat. No. 4,107,131, the disclosure of which is hereby incorporated by reference.

TABLE A

1. Thermoplastic Polyester
2. Thermoplastic Polyurethane
3. Poly(aryl ether) and Poly(aryl sulfone)
4. Polycarbonate
5. Acetal resin
6. Polyamide
7. Halogenated thermoplastic
8. Nitrile barrier resin
9. Poly(methyl methacrylate)
10. Cyclic olefin copolymers Tackifying resins include polystyrene block compatible resins and midblock compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (mid) block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ" and "ARKON.

The polymer blends of the present invention may be compounded further with other polymers, oils, fillers, reinforcements, antioxidants, stabilizers, fire retardants, antiblocking agents, lubricants and other rubber and plastic compounding ingredients without departing from the scope of this invention.

Examples of various fillers that can be employed are found in the 1971-1972 Modern Plastics Encyclopedia, pages 240-247. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quartz and silica fibers, ceramic fibers, metal fibers, natural organic fibers, and synthetic organic fibers. Especially preferred are reinforced polymer blends of the instant invention containing about 2 to about 80 percent by weight glass fibers, based on the total weight of the resulting reinforced blend. Coupling agents, such as various silanes, may be employed in the preparation of the reinforced blends.

Regarding the relative amounts of the various ingredients, this will depend in part upon the particular end use and on the particular block copolymer that is selected for the particular end use. Table B below shows some notional compositions expressed in percent weight, which are included in the present invention. For the "Polymer" amount, a portion may include conventional styrene block copolymers.

TABLE B

Applications, Compositions and Ranges

| Application | Ingredients | Composition % w. |
|---|---|---|
| Films, Molding, Alloys | Polymer | 1–99% |
|  | Ethylene copolymers: EVA, Ethylene/styrene | 99–1% |
| Personal Hygiene Films and Fibers | Polymer | 10–75% |
|  | PE | 0–30% |
|  | PP | 0–30% |
|  | Tackifying Resin | 5–30% |
|  | End Block Resin | 5–20% |
| Personal Hygiene Films and Fibers | Polymer | 50–90% |
|  | PE | 5–30% |
|  | PS | 0–20% |
|  | Tackifying Resin | 0–40% |
| Personal Hygiene Films and Fibers | Polymer | 45–85% |
|  | PS | 10–25% |
|  | Oil | 5–30% |
| Injection Molded articles | Polymer | 25–85% |
|  | Polyolefin | 5–50% |
|  | Oil | 10–50% |
| Injection molded/extrusion | Polymer | 55–90% |
|  | PPO | 10–50% |
|  | PS | 10–50% |
|  | Engineering Plastic | 10–50% |
|  | Oil | 0–50% |
| Cap Seals | Polymer | 25–90% |
|  | Oil and/or Tackifying Resin | 0–50% |
|  | PP | 0–50% |
|  | Filler | 0–25% |
|  | Lubricant | 0 to 3% |
| Engineering Thermoplastic toughening | Polymer or Maleated Polymer | 5–30% |
|  | Engineering thermoplastic, e.g. Nylon 6,6, TPU | 70–95% |
| Dipped Goods | Polymer | 60–100% |
|  | Plasticizer, oil | 0–40% |
| Polymer Modification | Polymer | 5–95% |
|  | ABS, PS, HIPS, Cyclic Olefin Copolymers | 95–5% |

The polymer of the present invention may be used in a large number of applications, either as a neat polymer or in a compound. The following various end uses and/or processes are meant to be illustrative, and not limiting to the present invention:

Polymer modification applications

Injection molding of toys, medical devices

Extruding films, tubing, profiles

Over molding applications for personal care, grips, soft touch applications, for automotive parts, such as airbags, steering wheels, etc Dipped goods, such as gloves Thermoset applications, such as in sheet molding compounds or bulk molding compounds for trays
Roto molding for toys and other articles
Slush molding of automotive skins
Thermal spraying for coatings
Blown film for medical devices
Blow molding for automotive/industrial parts
Films and fibers for personal hygiene applications
Tie layer for functionalized polymers

EXAMPLES

The following examples are provided to illustrate the present invention. The examples are not intended to limit the scope of the present invention and they should not be so interpreted. Amounts are in weight parts or weight percentages unless otherwise indicated.

Example 1

Various controlled distribution block copolymers of the present invention were prepared according to the process disclosed in copending patent application Ser. No. 60/355, 210 referenced above. Polymers 1-15, 24 and 25 are selectively hydrogenated linear ABA block copolymers where the A blocks are polystyrene blocks and the B block prior to hydrogenation is a styrene butadiene controlled distribution block having terminal regions that are rich in butadiene units and a center region that is rich in styrene units. The various polymers are shown in Table 1 below. These polymers were then used in the various applications described in the other Examples. Step I MW is the molecular weight of the first A block, Step II MW is the molecular weight of the AB blocks and Step III MW is the molecular weight of the ABA blocks. Table 1a shows certain analytical results along with the calculated styrene blockiness, for the B block and the calculated polystyrene content of the B block. Table 1b shows the individual block sizes for the polymers. The polymers were hydrogenated such that greater than about 95% of the diene double bonds have been reduced.

TABLE 1

Controlled Distribution Polymers

| Polymer Number | Step I MW(k) | Step II MW(k) | Step III MW(k) | 1,2-BD (%) | PSC (%) |
|---|---|---|---|---|---|
| 1 | 10.5 | 106.3 | 118.6 | 34.5 | 29.75 |
| 2 | 10.5 | 98.6 | 110.8 | 38 | 29.53 |
| 3 | 9.2 | 90.6 | 99.9 | 35.8 | 40.12 |
| 4 | 9.7 | 92.3 | 102.8 | 35.3 | 48.3 |
| 5 | 13.9 | 140.8 | 158.2 | 35 | 50.15 |
| 6 | 10.6 | 101.4 | 112.6 | 36.2 | 40 |
| 7 | 10.3 | 99.3 | 111.9 | 37.1 | 40.31 |
| 8 | 8.2 | 91.2 | 98.9 | 37 | 37 |
| 9 | 32 | 162 | 194.8 | 34.3 | 58.1 |
| 10 | 29.4 | 159.4 | 189.2 | 33.6 | 65.8 |
| 11 | 24 | 120.9 | 145.8 | 33.6 | 58.9 |
| 12 | 30.3 | 164.3 | 196.8 | 35.4 | 48.2 |
| 13 | 29.9 | 163.3 | 195.9 | 34.5 | 58.2 |
| 14 | 8.4 | 88.5 | 95.8 | 36.1 | 38.3 |
| 15 | 9 | 86.8 | 95.5 | 35.9 | 39.3 |
| 24 | 29 | 159 | 188 | 35 | 58 |
| 25 | 9.5 | 89.5 | 99 | 36 | 39 | where
"MW(k)" = molecular weight in thousands,
"1,2-BD, %" is the vinyl content of the butadiene part of the polymer and
"PSC (%)" = wt % of styrene in the final polymer.
Molecular weights are cumulative for the segments (Step II MW = segment MW for Step I and Step II; Step III MW is the final MW for the three block copolymers.

TABLE 1a

NMR Results for Polymers at the end of Step II

| Polymer Number | Expt. NMR PSC | Expt. NMR Blocky | Calc. Mid PSC | Calc. Mid Blocky |
|---|---|---|---|---|
| 1 | 22.2 | 50 | 13.7 | 10 |
| 2 | 22.2 | 51 | 12.9 | 6 |
| 3 | 33.5 | 34 | 26.0 | 5 |
| 4 | 44.5 | 27 | 38.0 | 4 |
| 5 | 44.7 | 29 | 38.6 | 9 |
| 6 | 33.5 | 33 | 25.7 | 3 |
| 7 | 33.5 | 34 | 25.8 | 4 |
| 8 | 32.1 | 30 | 25.4 | 3 |
| 9 | 49.9 | 43 | 37.6 | 6 |
| 10 | 59.0 | 34 | 49.7 | 4 |
| 11 | 50.4 | 40 | 38.1 | 1 |
| 12 | 38.8 | 48 | 25.0 | 1 |
| 13 | 50.0 | 39 | 38.8 | 4 |
| 14 | 32.3 | 30 | 25.2 | 1 |
| 15 | 33.4 | 33 | 25.7 | 3 |
| 24 | 50.7 | 42 | 39.7 | 9 |
| 25 | 33.3 | 31 | 25.7 | 0 |

TABLE 1b

Polymer Architecture for A1-B-A2 Polymers

| | Block Size (× 10⁻³) | | |
|---|---|---|---|
| Polymer | A1 | B | A2 |
| 1 | 10.5 | 95.8 | 12.3 |
| 2 | 10.5 | 88.1 | 12.2 |
| 3 | 9.2 | 81.4 | 9.3 |
| 4 | 9.7 | 82.6 | 10.5 |
| 5 | 13.9 | 127 | 17.4 |
| 6 | 10.6 | 90.8 | 11.2 |
| 7 | 10.3 | 89.0 | 12.6 |
| 8 | 8.2 | 62.3 | 7.7 |
| 9 | 32 | 81.6 | 32.8 |
| 10 | 29.4 | 64.7 | 29.8 |
| 11 | 24 | 59.9 | 24.9 |
| 12 | 30.3 | 102 | 32.5 |
| 13 | 29.9 | 81.9 | 32.6 |
| 14 | 8.4 | 59.1 | 7.3 |
| 15 | 9 | 58 | 8.7 |
| 24 | 29 | 130 | 29 |
| 25 | 9.5 | 80 | 9.5 |

Example 2

In this example three different block copolymers were compounded with varying amounts of an ethylene vinyl acetate copolymer (EVA) and the compounds were extruded into films. One of the block copolymers was a selectively hydrogenated SBS block copolymer (KRATON G 1652) and the other two block copolymers were controlled distribution block copolymers #14 and #15. The relative amounts and test results are shown Table 2 below. As shown in Table 2, adding 20% KRATON polymer to EVA increases impact resistance, decreases hysteresis set and increases recoverable energy in films. The improved impact resistance is important to reduce failure of a film from an external force, such as dropping. The increased recoverable energy and decreased hysteresis set is desirable for improved elasticity of a film. The advantage of polymers 14 and 15 over G1652 shows in the increased isotropic behavior seen in the Elmendorf Tear data. Isotropic tear is advantageous in film applications where straight tear along a seam is necessary, such as food wrap or wrapping for sterile surgical kits.

TABLE 2

| Block Copolymer | | | Compound 2-1 | 2-2 | 2-3 | 2-4 | 2-5 |
|---|---|---|---|---|---|---|---|
| Type | | EVA | #14 | #15 | G-1652 | #15 | G-1652 |
| Block Copolymer Amount %/wt | | 0% | 20% | 20% | 20% | 80% | 80% |
| EVA Copolymer Amount %/wt | | 100% | 80% | 80% | 80% | 20% | 20% |
| Property | Unit | Direction | EVA | 2-1 | 2-2 | 2-3 | 2-4 | 2-5 |

| Property | Unit | Direction | EVA | 2-1 | 2-2 | 2-3 | 2-4 | 2-5 |
|---|---|---|---|---|---|---|---|---|
| Tensile Properties | | | | | | | | |
| Tensile | psi | MD | 4727 | 3855 | 3846 | 4072 | 3344 | 6392 |
| | | TD | 4979 | 3752 | 3933 | 4023 | 3102 | 6889 |
| Ultimate elongation | % | MD | 655 | 601 | 603 | 630 | 698 | 839 |
| | | TD | 885 | 782 | 781 | 758 | 812 | 765 |
| 100% modulus | psi | MD | 737 | 570 | 663 | 574 | 404 | 385 |
| | | TD | 532 | 416 | 484 | 509 | 299 | 535 |
| 300% modulus | psi | MD | 1423 | 1055 | 1202 | 1044 | 683 | 638 |
| | | TD | 797 | 622 | 724 | 763 | 439 | 1003 |
| Elmendorf Tear | g/mil | MD | 81.9 | 24.9 | 26.9 | 31.7 | 16.1 | 80.6 |
| | | TD | 128.3 | 22.2 | 25.8 | 51.4 | 47.2 | 130.8 |
| Impact resistance | in-lbf/mls | | 4.7 | no failure | no failure | no failure | no failure | No failure |
| Cyclic hysteresis to 100% extension | | | | | | | | |
| Stress at 100% extension | psi | MD | 475 | 466 | 492 | 511 | 338 | 444 |
| | | TD | 358 | 387 | 379 | 399 | 254 | 277 |
| Recoverable energy after 1 cycle | % | MD | 33.4 | 41.6 | 42.8 | 43.3 | 64.1 | 48.1 |
| | | TD | 32.6 | 44.3 | 42.3 | 41.6 | 68.3 | 63 |
| Hysteresis set @ 1 cycle | % | MD | 29.3 | 18.5 | 17 | 15 | 11 | 11 |
| | | TD | 36.1 | 16.4 | 18.5 | 19.1 | 11.7 | 9.9 |
| Cyclic hysteresis to 300% extension | | | | | | | | |
| Stress at 300% extension | psi | MD | 958 | 941 | 818 | 987 | 504 | 667 |
| | | TD | 539 | 554 | 458 | 568 | 384 | 462 |
| Recoverable energy after 1 cycle | % | MD | 13.5 | 19.3 | 18.3 | 18.6 | 50.7 | 40.1 |
| | | TD | 16 | 23.5 | 21.8 | 22.3 | 57.8 | 51.5 |
| Hysteresis set @ 1 cycle | % | MD | 190 | 133 | 141 | 141 | 37 | 32.7 |
| | | TD | 186 | 125 | 139 | 134 | 34.6 | 27.4 |

Example 3

In this example three different block copolymers were compounded with varying amounts of a propylene homopolymer (Valtec HH442H PP), a low-density polyethylene (Petrothene NA601-04) and two different resins (Regalite R-1125 and Kristalex F-100). Regalite R-1125 is a midblock-compatible resin, and Kristalex F-100 is a styrene containing end block resin. The block copolymers were controlled distribution block copolymers #14 and #15, and a selectively hydrogenated SBS block copolymer (KRATON G 1657).

The compounds were formed into fibers and tested. Table 3 below shows the compounds used and the test results. As shown in Table 3 Polymers 14 and 15 exhibit lower permanent set and retain their properties better under stress, as shown by the stress-decay values, than normal SEBS triblock copolymers. This is true for simple blends with LDPE and PP (examples 3-1 to 3-6) and in more complex formulations with resins (examples 3-7 and 3-8).

TABLE 3a

| Formulation, % weight | Compound Number | | | | | |
|---|---|---|---|---|---|---|
| | 3-1 | 3-2 | 3-3 | 3-4 | 3-5 | 3-6 |
| Kraton G-1657 | 75 | | | 75 | | |
| Polymer #14 | | 75 | | | 75 | |
| Polymer #15 | | | 75 | | | 75 |
| Valtec HH442H PP | | | | 25 | 25 | 25 |
| Petrothene NA601-04 LDPE | 25 | 25 | 25 | | | |
| MFR (230° C./2.16 kg) | 29 | 10.2 | 9.5 | 22 | 7.6 | 7.3 |
| fiber data | | | | | | |
| 50% modulus, MPa | 1.5 | 1.70 | 1.77 | 3.5 | 2.32 | 4.10 |
| 100% modulus, MPa | 1.8 | 2.08 | 2.14 | 3.8 | 3.19 | 5.10 |
| 50% modulus at 40° C., MPa | 1.33 | 1.43 | 1.49 | 2 | 2.16 | 3.66 |
| 50% modulus at 40° C. after 2 hrs Mpa | 0.72 | 0.83 | 0.92 | 0.51 | 1.10 | 1.69 |
| Stress-decay, (%) | 46 | 42 | 38 | 75 | 49 | 54 |
| Permanent set (%) | 12 | 10 | 11 | 16 | 11.5 | 21 |

TABLE 3b

| Formulation, % weight | Compound Number | |
|---|---|---|
| | 3-7 | 3-8 |
| Kraton G-1657 | | |
| Polymer #14 | 65 | |
| Polymer #15 | | 65 |
| Valtec HH442H PP | 15 | 15 |
| Petrothene NA601-04 LDPE | | |
| Regalite R-1125 resin | 10 | 10 |
| Kristalex F-100 resin | 10 | 10 |
| MFR (230° C./2.16 kg) | 12.4 | 11.5 |
| fiber data | | |
| 50% modulus, MPa | 1.39 | 1.68 |
| 100% modulus, MPa | 1.85 | 2.23 |
| 50% modulus at 40° C., MPa | 1.30 | 1.43 |
| 50% modulus at 40° C. after 2 hours, MPa | 0.79 | 0.89 |
| Stress-decay (%) | 39 | 38 |
| Permanent set (%) | 7.5 | 8.5 |

Example 4

In this example three different block copolymers were compounded with mineral oil (Drakeol 34 mineral oil) and crystal polystyrene (EA 3000). The block copolymers were controlled distribution block copolymers #3 and #4, and a selectively hydrogenated SBS block copolymer (GRP 6926). All three of the block copolymers had approximately the same molecular weights for the end blocks and mid block. The various components were compounded and then formed into films, and tested. The amounts are expressed in percent weight. The various formulations and test results are shown below in Table 4. As shown in Table 4 the modulus and hysteresis values for the comparison example 4-1 vary by almost a factor of two between the machine direction, MD, and transverse direction, TD. This indicates a high degree of orientation during film casting resulting in film with highly anistropic properties and dimensional instability. By comparison examples 4-2 and 4-3 show a much smaller difference in Modulus, recoverable energy and permanent set at all elongations between the MD and TD directions. The values of recoverable energy are surprisingly high and permanent set in the MD for examples 4-2 and 4-3 are surprisingly low, indicating a much more elastic film than a traditional SEBS triblock copolymer.

TABLE 4a

| Formulation | Compound Number | | |
|---|---|---|---|
| | 4-1 % | 4-2 % | 4-3 % |
| GRP 6926 SEBS | 58.4 | | |
| Polymer #3 | | 58.83 | |
| Polymer #4 | | | 58.83 |
| G1650 | | | |
| Drakeol 34 mineral oil | 23.66 | 23.81 | 23.81 |
| EA3000 Polystyrene | 17.94 | 17.35 | 17.35 |
| Tensile | | | |
| Max. Stress, psi TD | 3716 | 3503 | 3580 |
| Max. Stress, psi MD | 3151 | 3831 | 3196 |
| Ultimate Elongation, % TD | 931 | 790 | 708 |
| Ultimate Elongation, % MD | 829 | 756 | 656 |

TABLE 4a-continued

| Formulation | Compound Number | | |
|---|---|---|---|
| | 4-1 % | 4-2 % | 4-3 % |
| 50% Modulus, psi TD | 118 | 103 | 96 |
| 50% Modulus, psi MD | 271 | 119 | 104 |
| 100% Modulus, psi TD | 148 | 138 | 129 |
| 100% Modulus, psi MD | 341 | 165 | 148 |
| 200% Modulus, psi TD | 210 | 210 | 200 |
| 200% Modulus, psi MD | 480 | 271 | 257 |
| 300% Modulus, psi TD | 291 | 327 | 324 |
| 300% Modulus, psi MD | 630 | 447 | 458 |
| 500% Modulus, psi TD | 593 | 913 | 1030 |
| 500% Modulus, psi MD | 1080 | 1270 | 1393 |
| 100% TD Hysteresis (75° F.) (10 in/min) | | | |
| Stress @ 100% extension, psi | 136.4 | 212.5 | 144.8 |
| Recoverable energy @ cycle 1, % | 79.4 | 89.1 | 88.6 |
| Hysteresis set @ cycle 1, % | 4.9 | 4.7 | 4.9 |
| 100% MD Hysteresis (75° F.) (10 in/min) | | | |
| Stress @ 100% extension, psi | 379.5 | 144.7 | 175.5 |
| Recoverable energy @ cycle 1, % | 46.3 | 86.4 | 85.5 |
| Hysteresis set @ cycle 1, % | 8.7 | 4.9 | 4.8 |

TABLE 4b

| | Compound Number | | |
|---|---|---|---|
| | 4-1 % | 4-2 % | 4-3 % |
| 200% TD Hysteresis (75° F.) (10 in/min) | | | |
| Stress @ 200% extension, psi | 231.7 | 225.2 | 166.9 |
| Recoverable energy @ cycle 1, % | 73.3 | 88.9 | 87.3 |
| Hysteresis set @ cycle 1, % | 8.6 | 7.4 | 8.9 |
| 200% MD Hysteresis (75° F.) (10 in/min) | | | |
| Stress @ 200% extension, psi | 610.8 | 301.5 | 223.7 |
| Recoverable energy @ cycle 1, % | 40.3 | 82.8 | 81.3 |
| Hysteresis set @ cycle 1, % | 16.4 | 7.5 | 8.7 |
| 300% TD Hysteresis (75° F.) (10 in/min) | | | |
| Stress @ 200% extension, psi | 278.6 | 298.3 | 347.2 |
| Recoverable energy @ cycle 1, % | 68.2 | 87.3 | 85 |
| Hysteresis set @ cycle 1, % | 13.2 | 9.1 | 11.1 |
| 300% MD Hysteresis (75° F.) (10 in/min) | | | |
| Stress @ 200% extension, psi | 609.6 | 436.7 | 541.7 |
| Recoverable energy @ cycle 1, % | 36.5 | 78 | 75.2 |
| Hysteresis set @ cycle 1, % | 25.4 | 9.6 | 11.3 |
| Stress Relaxation @ 150%, TD (20 in/min) @ 100° F. for 60 min. | | | |
| Max Stress, psi | 196.4 | 152.8 | 140.62 |
| Stress @ 1 hr, psi | 152.7 | 128 | 115.2 |
| % Relaxation, % | 22 | 16.2 | 18.1 |
| Stress Relaxation @ 150%, MD (20 in/min) @ 100° F. for 60 min. | | | |
| Max Stress, psi | 395 | 175 | 183 |
| Stress @ 1 hr, psi | 269 | 142 | 122 |
| % Relaxation, % | 32 | 18.9 | 33.44 |

Example 5

In this example two different controlled distribution block copolymers (#13 and #3) were compounded with two different ethylene styrene copolymers, which copolymers were made with a metallocene catalyst and had a random structure. These copolymers were Dow 2900TE having a styrene content of 34.2% w and Dow 2901TE, having a styrene content of 72.7% w. The various components were mixed in a Brabender mixer and then formed into compression-molded films. The various formulations and results are shown below in Table 5. As shown in Table 5 the addition of 2900TE to Polymer #3 increases strength across the complete composition range from 90/10 to 10/90 while retaining high elongation. Surprisingly, Examples 5-2 through 5-4 are transparent with excellent hysteresis recovery and low permanent set. The higher styrene content of 2901TE produces opaque compounds (examples 5-8 through 5-13) that still retains high strength and elongation across the range. The addition of polymer #13 to 2900TE, examples 5-15 to 5-17, decreases permanent set and improves hysteresis recovery and elongation without loss of tensile strength. Examples 5-2 through 5-6 have the unexpected benefit of having higher tensile strength than the two polymers of which they are composed.

TABLE 5a

Molded Films

| FORMULATION (% weight): | 5-1 | 5-2 | 5-3 | 5-4 | 5-5 | 5-6 | 5-7 |
|---|---|---|---|---|---|---|---|
| Polymer #13 | | | | | | | |
| Polymer #3 | 100 | 90 | 80 | 50 | 30 | 20 | 10 |
| 2900 TE | | 10 | 20 | 50 | 70 | 80 | 90 |
| 2901 TE | | | | | | | |
| AO 330 | 0.2 | 0.2 | 0.2 | 0.2 | 0.2 | 0.2 | 0.2 |
| Properties: | | | | | | | |
| Stress-Strain | | | | | | | |
| Max. Stress, psi | 4106 | 6118 | 6088 | 8014 | 6494 | 6647 | 5901 |
| Ultimate Elongation, % | 789 | 840 | 829 | 794 | 739 | 741 | 695 |
| 50% Modulus, psi | 236 | 285 | 395 | 314 | 454 | 485 | 466 |
| 100% Modulus, psi | 308 | 346 | 464 | 408 | 566 | 604 | 599 |
| 200% Modulus, psi | 459 | 480 | 624 | 599 | 785 | 849 | 862 |
| 300% Modulus, psi | 680 | 672 | 848 | 891 | 1159 | 1254 | 1302 |
| 500% Modulus, psi | 1402 | 1501 | 1898 | 2192 | 2816 | 2793 | 3071 |
| 100% Hysteresis: | | | | | | | |
| Max. stress, psi | 372.9 | 271.3 | 346.2 | 363.9 | 452 | 491.9 | 515.7 |
| Perm. Set, % | 7.5 | 7.4 | 8.6 | 9.7 | 10.3 | 10.3 | 10.4 |
| 1st Cycle Recovery, % | 67.7 | 74 | 67.7 | 66.4 | 63.1 | 62.5 | 60.7 |
| Load Stress 50% ext., psi | 297 | 228 | 284 | 286 | 356 | 387 | 408 |
| Unload Stress 50% ext., psi | 197 | 168 | 187 | 177 | 204 | 218 | 221 |
| Stress @ 50% Ext. 2nd load, psi | 214 | 186 | 215 | 222 | 265 | 287 | 298 |
| Stress @ 50% Ext. 2nd Unload, psi | 190 | 163 | 180 | 170 | 195 | 208 | 210 |
| 2nd Cycle Recovery, % | 90.5 | 89.7 | 87.2 | 82.3 | 80.4 | 79.8 | 78.6 |
| 300% Hysteresis: | | | | | | | |
| Max. stress, psi | 500.4 | 533.6 | 537.6 | 711.8 | 864.3 | 914.4 | 968.2 |
| Perm. Set, % | 15.4 | 20.1 | 26.6 | 53.8 | 79.1 | 89.4 | 102 |
| 1st Cycle Recovery, % | 69.4 | 65.1 | 58.8 | 43.7 | 34.8 | 32.7 | 29.9 |
| Load Stress 50% ext., psi | 215.4 | 234.3 | 240.4 | 290.7 | 379.7 | 404.6 | 429.8 |
| Unload Stress 50% ext., psi | 97.4 | 81.7 | 60.2 | n/a | n/a | n/a | n/a |
| 100% Cyc-1 Load Stress, psi | 267.7 | 282.7 | 289.5 | 366.1 | 473.9 | 506.3 | 533.4 |
| 100% Stress Cyc-1 Unload, psi | 161.6 | 152.6 | 129.9 | 78.8 | 39.8 | 22.2 | n/a |

TABLE 5b

Molded Films

| FORMULATION (% weight): | 5-8 | 5-9 | 5-10 | 5-11 | 5-12 | 5-13 |
|---|---|---|---|---|---|---|
| Polymer #13 | | | | | | |
| Polymer #3 | 90 | 80 | 50 | 30 | 20 | 10 |
| 2900 TE | | | | | | |
| 2901 TE | 10 | 20 | 50 | 70 | 80 | 90 |
| AO 330 | 0.2 | 0.2 | 0.2 | 0.2 | 0.2 | 0.2 |
| Properties: | | | | | | |
| Stress-Strain | | | | | | |
| Max. Stress, psi | 4721 | 5450 | 4089 | 4121 | 4581 | 4820 |
| Ultimate Elongation, % | 749 | 689 | 443 | 398 | 396 | 376 |
| 50% Modulus, psi | 328 | 282 | 252 | 329 | 364 | 371 |
| 100% Modulus, psi | 392 | 350 | 357 | 458 | 531 | 592 |
| 200% Modulus, psi | 550 | 534 | 719 | 968 | 1218 | 1534 |
| 300% Modulus, psi | 790 | 862 | 1748 | 2569 | 3056 | 3349 |
| 500% Modulus, psi | 1842 | 2584 | n/a | N/A | N/A | N/A |

TABLE 5b-continued

| | Molded Films | | | | | |
|---|---|---|---|---|---|---|
| FORMULATION (% weight): | 5-8 | 5-9 | 5-10 | 5-11 | 5-12 | 5-13 |
| 100% Hysteresis: | | | | | | |
| Max. stress, psi | 317.3 | 292.6 | 355.5 | 359 | 426.6 | 555.6 |
| Perm. Set, % | 11.4 | 15.2 | 24.7 | 31.8 | 33.3 | 40 |
| 1st Cycle Recovery, % | 66.6 | 62.1 | 50.4 | 42.7 | 37.9 | 30 |
| Load Stress 50% ext., psi | 256 | 240 | 254 | 243 | 289 | 371 |
| Unload Stress 50% ext., psi | 168 | 144 | 115 | 83 | 81 | 60 |
| Stress @ 50% Ext. 2nd load, psi | 196 | 186 | 223 | 222 | 247 | 281 |
| Stress @ 50% Ext. 2nd Unload, psi | 160 | 135 | 100 | 59 | 54 | 31 |
| 2nd Cycle Recovery, % | 85.5 | 79 | 57.8 | 46.1 | 43.1 | 38.5 |
| 300% Hysteresis: | | | | | | |
| Max. stress, psi | 648.4 | 788.3 | 2073.7 | 2315.6 | 2849.1 | 2735.3 |
| Perm. Set, % | 26.4 | 32.9 | 53 | 69.2 | 78.2 | 95.2 |
| 1st Cycle Recovery, % | 60.1 | 55.7 | 35.5 | 30.4 | 26.8 | 22.7 |
| Load Stress 50% ext., psi | 260.5 | 274 | 269.8 | 281.7 | 337.7 | 360.2 |
| Unload Stress 50% ext., psi | 71.1 | 53.4 | n/a | n/a | n/a | n/a |
| 100% Cyc-1 Load Stress, psi | 321.6 | 330.7 | 366.7 | 398 | 487.2 | 528.5 |
| 100% Stress Cyc-1 Unload, psi | 154.9 | 144 | 112.7 | 73.8 | 59.9 | 14.2 |

TABLE 5c

| | Molded Films | | | | | |
|---|---|---|---|---|---|---|
| FORMULATION (% weight): | 5-14 | 5-15 | 5-16 | 5-17 | 5-18 | 5-19 |
| Polymer #13 | 100 | 30 | 20 | 10 | | |
| Polymer #3 | | | | | | |
| 2900 TE | | 70 | 80 | 90 | 100 | |
| 2901 TE | | | | | | 100 |
| AO 330 | | 0.2 | 0.2 | 0.2 | | |
| Properties: | | | | | | |
| Stress-Strain | | | | | | |
| Max. Stress, psi | 5260.5 | 6232 | 6379 | 5487 | 5916 | 4209 |
| Ultimate Elongation, % | 714.5 | 722.5 | 703 | 675 | 662 | 302 |
| 50% Modulus, psi | 497.5 | 495.5 | 522 | 534 | 438 | 372 |
| 100% Modulus, psi | 543 | 607.5 | 649 | 659.5 | 582 | 626 |
| 200% Modulus, psi | 772.5 | 851.5 | 916 | 927.5 | 876 | 1851 |
| 300% Modulus, psi | 1170 | 1254 | 1379 | 1364 | 1344 | n/a |
| 500% Modulus, psi | 2611 | 2727 | 3010 | 2872 | 2932 | n/a |
| 100% Hysteresis: | | | | | | |
| Max. stress, psi | 490.4 | 468.2 | 489 | 532.3 | 543.6 | 613.8 |
| Perm. Set, % | 20.4 | 15 | 14.1 | 14.5 | 13 | 40.9 |
| 1st Cycle Recovery, % | 39.4 | 54.6 | 55.2 | 53.6 | 55.3 | 30.5 |
| Load Stress 50% ext., psi | 456 | 373 | 389 | 423 | 424 | 366 |
| Unload Stress 50% ext., psi | 162 | 178 | 187 | 195 | 201 | 54 |
| Stress @ 50% Ext. 2nd load, psi | 263 | 265 | 280 | 298 | 295 | 278 |
| Stress @ 50% Ext. 2nd Unload, psi | 152 | 167 | 178 | 186 | 191 | 29 |
| 2nd Cycle Recovery, % | 67 | 73.7 | 73.8 | 73 | 75.1 | 39.3 |
| 300% Hysteresis: | | | | | | |
| Max. stress, psi | 921 | 933.1 | 943.8 | 1046.2 | 1013.2 | *samples broke, exceeded limits |
| Perm. Set, % | 42.3 | 93.5 | 102.2 | 108.3 | 113.6 | |
| 1st Cycle Recovery, % | 38.9 | 30 | 29.5 | 28.3 | 28.3 | |
| Load Stress 50% ext., psi | 452.1 | 408 | 413.5 | 460.7 | 409.7 | |
| Unload Stress 50% ext., psi | 25.2 | n/a | n/a | n/a | n/a | |
| 100% Cyc-1 Load Stress, psi | 487 | 500.1 | 511.1 | 569.1 | 526.3 | |
| 100% Stress Cyc-1 Unload, psi | 119.5 | 13.9 | 6.5 | n/a | n/a | |

Example 6

In this example one controlled distribution block copolymer (#9) was compared against a selectively hydrogenated SBS block copolymer (KRATON G 1651) in various compounds with extending oil and polypropylene homopolymer. The various formulations and results are shown below in Table 6. As shown in Table 6, compositions made with polymer #9 have much improved melt flows compared with compositions made with G-1651. Surprisingly, the tensile strengths of compositions made with polymer #9 are almost the same in the machine and transverse directions in the mold when compared to G-1651 compositions. This means that parts formed by injection molding or extrusion will fill the mold better, have much less tendency to warp when exposed to heat, and will have more uniform properties when Polymer #9 is substituted for G-1651. This stability means they will have opportunities for use in medical applications.

extending oil used was Primol 352. To the oil and polymer were added various other components including polypropylene, poly(phenylene oxide) (Blendex HPP857), polystyrene, syndiotactic polystyrene (MA 405), cyclic olefin copolymer (Topas 6017) and ABS (Terluran 967 K). The

TABLE 6

| | | | Compound # | | | | | |
|---|---|---|---|---|---|---|---|---|
| Polymer Type | | | 6-1 #9 | 6-2 G-1651 | 6-3 #9 | 6-4 G-1651 | 6-5 #9 | 6-6 G-1651 |
| Formulation | | | | | | | | |
| Polymer | | phr | 100 | 100 | 100 | 100 | 100 | 100 |
| PP Pm6100 | | phr | 25 | 25 | 50 | 50 | 75 | 75 |
| Oil | | phr | 90 | 90 | 140 | 140 | 90 | 90 |
| Properties | | | | | | | | |
| MFR 200° C./5 kg | | g/10 min | 5.6 | 0.1 | 120 | 26 | 30 | 7 |
| Hardness Shore A | | 30 sec | 43 | 55 | 53 | 61 | 82 | 85 |
| Resilience | | % | 52 | 55 | 47 | 46 | 46 | 43 |
| Din Abrasion | | mm3 | 285 | 110 | 244 | 95 | 146 | 65 |
| Tensile properties | | | | | | | | |
| Mod 300% | MD | MPa | 2.5 | 4 | 2.5 | 4 | 5.9 | 7 |
| Mod 300% | PMD | MPa | 2.2 | 3 | 2.4 | 3 | 5.2 | 5 |
| Tensile Strength | MD | MPa | 6.6 | 4 | 3 | 5 | 8.5 | 10 |
| Tensile Strength | PMD | MPa | 8.1 | 13 | 2.9 | 12 | 9.6 | 21 |
| Elongation at Break | MD | % | 700 | 330 | 450 | 510 | 520 | 500 |
| Elongation at Break | PMD | % | 805 | 780 | 470 | 790 | 615 | 805 |
| Trouser tear | MD | kN/m | 9.6 | 7 | 6.9 | 9 | 17.5 | 18 |
| Trouser tear | PMD | kN/m | 8.9 | 8 | 7.8 | 10 | 23 | 21 |

Example 7

In this example two different controlled distribution block copolymers (#11 and #9) were compared against two different selectively hydrogenated SBS block copolymers (KRATON G 1651 and 1654) in oiled compounds. The various formulations and results are shown below in Table 7. As shown in Table 7 compositions based on polymers #9 and 11 are more isotropic than the comparison polymer while maintaining a good balance of properties. They can also be blended with a variety of engineering thermoplastics to yield a good balance of isotropic properties.

TABLE 7a

| | Compound | | | | | | | | |
|---|---|---|---|---|---|---|---|---|---|
| | 7-1 | 7-2 | 7-3 | 7-4 | 7-5 | 7-6 | 7-7 | 7-8 | 7-9 |
| Polymer #11 | 100 | 100 | 100 | 100 | 100 | | 100 | | |
| Polymer #9 | | | | | | 100 | | | |
| G1651 | | | | | | | | 100 | |
| G1654 | | | | | | | | | 100 |
| Primol 352 | 80 | 80 | 80 | 80 | 80 | 110 | 110 | 110 | 110 |
| PP (MFR = 5.5) | | | | | | 45 | 45 | 45 | 45 |
| PPO (Blendex HPP857) | 40 | | | | | | | | |
| PS 144C | | 40 | | | | | | | |
| Syndiotactic PS (MA 405) | | | 40 | | | | | | |
| COC (Topas 6017) | | | | 40 | | | | | |
| ABS (Terluran 967 K) | | | | | 40 | | | | |
| Presence of IPN | no | no | no | yes | no | yes | yes | yes | yes |
| Hardness, Shore A | | | | | | | | | |
| 30 sec | 74 | 50 | 40 | 52 | 50 | 59 | 61 | 64 | 63 |
| Compression set, % | | | | | | | | | |
| 70° C./24 hrs | 65 | 73 | 84 | 82 | 83 | 54/56 | 56/65 | 42 | 48/50 |
| 100° C./24 hrs | 97 | 100 | 100 | 100 | 100 | 84 | 97 | 62 | 81 |

TABLE 7b

| | Compound | | | | | | | | |
|---|---|---|---|---|---|---|---|---|---|
| | 7-1 | 7-2 | 7-3 | 7-4 | 7-5 | 7-6 | 7-7 | 7-8 | 7-9 |
| Stress strain properties MD | | | | | | | | | |
| 300% Modulus, MPa | 4.9 | 5.3 | 4.7 | 3 | 4.8 | 3.3 | 3.8 | 3.9 | 4.2 |
| Ts at break MPa | 5.2 | 6.5 | 7.8 | 7.4 | 5.5 | 4.8 | 5.5 | 5.7 | 5.3 |
| Elongation at break | 350 | 400 | 470 | 650 | 550 | 560 | 580 | 570 | 460 |
| Delamination | no | no | no | no | yes | no | no | no | no |
| PMD | | | | | | | | | |
| 300% Modulus, MPa | 5.3 | 2.9 | 3.1 | 2.2 | 3.2 | 2.7 | 2.9 | 2.7 | 3 |
| Ts at break MPa | 6.5 | 14.2 | 11 | 9.3 | 6.7 | 4.5 | 4.8 | 13.3 | 13 |
| Elongation at break | 445 | 740 | 670 | 750 | 750 | 650 | 640 | 900 | 900 |
| Delamination | no | no | no | no | yes | no | no | no | no |
| Anisotropy (TSpmd/TSmd) | 1.2 | 2.2 | 1.4 | 1.3 | 1.2 | 0.94 | 0.9 | 2.3 | 2.5 |
| Angle Tear Strength, kN/m | | | | | | | | | |
| Md | nm | 27 | 24 | 26 | 28 | 22 | 25 | 30 | 30 |
| Delamination | — | no | minor | no | yes | no | no | no | no |
| Pmd | nm | 37 | 32 | 26 | 32 | 22 | 25 | 35 | 35 |
| Delamination | — | no | minor | no | yes | no | no | no | no |

Example 8

In this example three different controlled distribution block copolymers (#3, #4 and #5) were compared against a selectively hydrogenated SBS block copolymer (KRATON G 1651) in formulations comprising polymer, polypropylene (PP 5A15H), extending oil (Drakeol 34) and silica. These formulations are intended for use as cap seals for screw top containers. The compounds mentioned in Table 8 were prepared by preblending the raw materials then mixing under heat and shear until a uniform blend was achieved. Blending viscosity for compounds with polymers 3,4 and 5 was lower than for G1651 compound. Each compound was then molded under heat and pressure to make a plaque of uniform thickness. Samples from these plaques were tested on a mechanical properties instrument, the results being found in Table 8.

Polymers 3,4 and 5 show much more isotropic tensile strength compared to G 1651. Polymer 5 has considerably lower molecular weight than G 1651, yet exhibits the same tensile and elongation properties. Coefficient of friction shows that increasing the amount of styrene in the midblock lowers the surface friction of the molded part.

The advantages of compounds made with polymers 3,4 and 5 include:
1. Lower blending viscosity results in easier mold processing
2. Isotropic behavior allows dimensional stability in molded parts
3. Increase in tensile, elongation and modulus allows for use of less polymer in compounds
4. Decrease in coefficient of friction allows for use in applications where low friction surfaces are desirable, such as bottle cap seals.

TABLE 8

| | | | Compound # | | | |
|---|---|---|---|---|---|---|
| | | | 8-1 | 8-2 | 8-3 | 8-4 |
| Polymer Type | | | G-1651 | #3 | #4 | #5 |
| Formulation (parts by weight) | | | | | | |
| Polymer | | | 100 | 100 | 100 | 100 |
| Drakeol 34 | | | 100 | 100 | 100 | 100 |
| PP5A15H | | | 34 | 34 | 34 | 34 |
| Silica | | | 41 | 41 | 41 | 41 |
| Property | Unit | Direction | | | | |
| Tensile Properties | | | | | | |
| Tensile | psi | MD | 810 | 629 | 673 | 1378 |
| | | TD | 1343 | 619 | 636 | 1440 |
| Ultimate elongation | % | MD | 616 | 646 | 686 | 858 |
| | | TD | 872 | 740 | 599 | 883 |
| 100% modulus | psi | MD | 207 | 297 | 232 | 228 |
| | | TD | 195 | 230 | 266 | 228 |
| 300% modulus | psi | MD | 404 | 453 | 363 | 452 |
| | | TD | 384 | 381 | 421 | 456 |
| COF | | Static | 2.05 | 1.59 | 1.05 | 0.823 |
| | | Dynamic | 2.03 | 1.15 | 1.15 | 0.698 |

Example 9

In this example two different controlled distribution block copolymers (#15 and #16) were compared with KRATON FG-1901 in blends with Nylon 6,6 (Zytel 101) at 15 and 20% by weight in a twin screw extruder. Polymer #16 was prepared by maleating Polymer #15 to a level of 1.7% weight bound maleic anhydride in a Berstorff twin screw extruder. KRATON FG 1901 is a commercial S-EB-S block copolymer that has a similar level of 1.7% weight maleation. The blends were injection molded and the impact strength was measured using an Izod impact tester. Samples were taken both from the blind end of the mold and the gate end of the mold to minimize molding effects.

As shown in Table 9, the addition of maleic anhydride dramatically improves the ability of Polymer #15 to toughen Nylon 6,6. The greater toughness presented by the maleated Polymer #15 might allow less modifier to be used to achieve the same toughness compared to available materials.

TABLE 9

| Formulation (% weight) | 9-1 | 9-2 | 9-3 | 9-4 | 9-5 |
|---|---|---|---|---|---|
| Polymer #15 | 20 | | | | |
| Polymer #16 | | 15 | 20 | | |
| KRATON FG 1901 | | | | 15 | 20 |
| Nylon 6,6 | 80 | 85 | 80 | 85 | 80 |
| Notched Izod Impact Test (foot pounds per inch) | | | | | |
| Gate end | 2.05 | 20.7 | 25.1 | 13.2 | 21.2 |
| Blind end | 2.08 | 23.6 | 25.9 | 13.5 | 23.1 |

Example 10

In this example we compared a controlled distribution copolymers (#14) with KRATON G 1650 in an experiment to prepare dipped articles. The method employed was as follows: first the polymer was dissolved in toluene. If needed, plasticizer was added to control viscosity. The solution was filtered through 100 mesh metal filter. Then a glass tube (diameter 25 mm, L=25 cm) was immersed in the solution. The glass tube was removed from the solution at an appropriate speed to obtain a homogeneous film on the tube. The solvent was allowed to evaporate. The typical evaporation time for toluene at 45-50° C. is 5 minutes. Next the glass tube was cooled to room temperature. The dipping sequence was repeated as needed. After the last dip, the solvent was allowed to evaporate completely (1-2 hours at 45-50° C.). The tube was cooled down and the film removed carefully from the glass tube. Tensile Testing was conducted according to ISO 4074-9 after cutting circular test-samples from the samples.

As shown in Table 10, Polymer #14 exhibits an advantaged combination of viscosity, tensile strength and set at break.

TABLE 10

| | Sample ID | | | | |
|---|---|---|---|---|---|
| Polymer | 10-1 14 | 10-2 14 | 10-3 G1650 | 10-4 G1650 | 10-5 G1650 |
| Concentration % w | 13 | 10 | 15 | 15 | 15 |
| Brookfield viscosity | 250 | 150 | 375 | 370 | 365 |
| Oil content phr | 0 | 25 | 0 | 25 | 50 |
| PS MW k | 10 | 10 | 10 | 10 | 10 |
| PSC. eff. % w | 20 | 16 | 30 | 24 | 20 |
| Number of dips | 2–3 | 3 | 2 | 2 | 2 |
| Thickness micro-m | 50 | 50 | 100 | 75 | 80 |
| Stress 100% MPa | 1.8 | 1.0 | 1.6 | 1.5 | 1.3 |
| Stress 300% MPa | 3.8 | 1.9 | 3.1 | 2.6 | 2.2 |
| Elongation % | 500 | 550 | 450 | 650 | 810 |
| Force N | 30 | 25 | 35 | 60 | 65 |
| Tensile strength MPa | 24 | 18 | 12 | 30 | 27 |
| Set after break % | 3 | 5 | 6 | 8 | 15 |

Example 11

In this example we compared two different controlled distribution block copolymers (#2 and #3) with KRATON G-1730, a selectively hydrogenated S-I-S-I tetra block copolymer in various compounds useful in personal hygiene articles. Some compounds only contained the controlled distribution polymer or G-1730 plus polyethylene (PE NA601), while other compounds also contained a resin (Regalrez 1126).

The first set of compounds (numbers 1 to 6) were prepared in the brabender mixing head on small scale. Following that larger amounts of the control formulation containing G-1730 and one other controlled distribution copolymer compound (compound #7 and 8) were compounded on a twin screw extruder. The pellets were then transformed into film on a cast film line. The properties of those films were measured in the machine (MD) and transverse (TD) directions. The examples shown in Table 11 reveal that the polymers of the present invention give much higher modulus values while retaining the other good properties of the control compound. Those higher modulus values are a result of the stiffer stretch of the inventive polymers and allow elastic laminate constructions having higher force or allow the same laminate to be made more efficiently with less elastomer. The films made form the present invention surprisingly have much greater tear strength than the control films.

TABLE 11a

| | Compounds: | | | | | |
|---|---|---|---|---|---|---|
| Polymer | 1 G-1730 | 2 #2 | 3 #3 | 4 G-1730 | 5 #2 | 6 #3 |
| Polymer | 68% | 68% | 68% | 84.80% | 84.80% | 84.80% |
| Regalrez 1126 | 20% | 20% | 20% | | | |
| PE NA601 | 11.80% | 11.80% | 11.80% | 15% | 15% | 15% |
| AO 330 | 0.20% | 0.20% | 0.20% | 0.20% | 0.20% | 0.20% |
| Properties (from plaques): | | | | | | |
| Stress-Strain | | | | | | |
| Max. Stress at Break, psi | 2090 | 3169 | 3255 | 1620 | 2859 | 2683 |
| Strain at Break, % | 1083 | 1057 | 895 | 927 | 1050 | 690 |
| 100% Modulus, psi | 141 | 159 | 165 | 231 | 300 | 314 |
| 200% Modulus, psi | 189 | 201 | 236 | 295 | 361 | 428 |

TABLE 11a-continued

| | Compounds: | | | | | |
|---|---|---|---|---|---|---|
| Polymer | 1<br>G-1730 | 2<br>#2 | 3<br>#3 | 4<br>G-1730 | 5<br>#2 | 6<br>#3 |
| 300% Modulus, psi | 250 | 256 | 321 | 382 | 440 | 580 |
| 500% Modulus, psi | 427 | 443 | 605 | 651 | 663 | 1165 |
| 100% Hysteresis | | | | | | |
| Perm. Set, % | 8.2 | 8.9 | 7.4 | 10.9 | 13.9 | 13.7 |
| 1st Cycle Recovery, % | 79.4 | 76.9 | 83.3 | 68.8 | 60.5 | 61.9 |

TABLE 11b

| | Compounds | |
|---|---|---|
| Polymer | 7<br>#3 | 8<br>G-1730 |
| Polymer | 68% | 68% |
| Regalrez 1126 | 20% | 20% |
| PE NA601 | 11.80% | 11.80% |
| AO 330 | 0.20% | 0.20 |

| | Properties, (from films): | | | |
|---|---|---|---|---|
| | MD | TD | MD | TD |
| Stress-Strain | | | | |
| Max. Stress at Break, psi | 3635 | 3124 | 3213 | 1924 |
| Strain at Break, % | 769 | 773 | 888 | 787 |
| 100% Modulus, psi | 168 | 137 | 122 | 106 |
| 200% Modulus, psi | 212 | 175 | 158 | 139 |
| 300% Modulus, psi | 273 | 243 | 211 | 189 |
| 500% Modulus, psi | 357 | 336 | 281 | 255 |
| | 689 | 661 | 535 | 498 |
| 100% Hysteresis | | | | |
| Perm. Set, % | 8.7 | 6.6 | 6.5 | 7.2 |
| 1st Cycle Recovery, % | 69.4 | 78.7 | 78.8 | 78.8 |
| | 98 | 103 | 84 | 58 |
| 300% Hysteresis: | | | | |
| Perm. Set, % | 31.1 | | 16.9 | |
| 1st Cycle Recovery, % | 56.8 | | 71.3 | |
| 100% Stress Cyc-1 Unload, psi | 85.2 | | 80.5 | |
| Stress Relaxation @ 150% Strain | | | | |
| Max. Stress, psi | 196 | | 153 | |
| Stress @ End of Test, psi | 162 | | 116 | |
| % Relax @ 30', % | 18 | | 25 | |
| Elmendorff tear: | | | | |
| Tear strength(g/mils) | 105.7 | 112.4 | 85 | 77 |

Example 12

This example is similar to Example #6, in that one controlled distribution block copolymer (#9) was compared against a selectively hydrogenated SBS block copolymer (KRATON G 1654) in a compound with extending oil and polypropylene homopolymer. The results are shown in Table 12. As shown in Table 12, the composition with Polymer #9 has much improved melt flows compared to compositions made with G-1654. Surprisingly, the compression set of the two compounds are nearly the same. This means that the compound made with Polymer #9 can be much more easily molded than the compound containing G-1654 while retaining approximately the same properties.

TABLE 12

Formulation (parts by weight)

100 pbw Block Copolymer
110 pbw Plasticiser (Primol 352)
45 pbw Polypropylene (MFR = 5.5)
0.2 pbw Irganox 1010
0.8 pbw Irganox PS 800
Extrusion conditions (W&Pfl ZSK 25) Werner Pfleiderer ZSK 25
Spiral flows conditions: Temperature of melt = 190° C./mould = 30° C., Injection time: 3 sec

| Polymer | G1654 | #9 |
|---|---|---|
| Spiral Flow, degrees | | |
| 500 bars | 450 | 670 |
| 750 bars | 670 | 890 |
| 900 bars | 790 | 980 |
| MFR, (g/10 min) | | |
| 230° C./2.16 kg | 1 | 25 |
| 200° C./5 kg | 4 | 60 |
| IPN test in toluene | | |
| PP content (% w) | 25 | 20 |
| Compression set % | | |
| 23° C./72 hrs | | |
| 70° C./24 hrs | 54 | 48 |
| 100° C./24 hrs | 81 | 84 |
| Hardness, Shore A | 63 | 59 |
| DIN Abrasion, mm3 | 90 | 325 |
| Oil bleed-out | No | No |
| Transparency | 3 | 1 |

Example 13

Topas® polymers are highly transparent cyclic olefin copolymers (COCs). It is believed that these polymers, available from Ticona, are polymerized from norbornene and ethylene using metallocene catalysts. One of the key attributes of Topas polymers is its excellent transparency. In the past it has been difficult to blend styrene elastomers with Topas polymers, and continue to retain transparency. We have blended Controlled Distribution Polymer #24 of the present invention with Topas 6015. This was compared to blends of Topas 6015 with KRATON G-1650, a conventional S-EB-S block copolymer not having any styrene in the mid block. As shown in Table 13 below, the result with using the controlled distribution polymer of the present invention (Compound 13-1) is a highly transparent material (close to pure Topas polymer), whereas the blend with the traditional hydrogenated styrene/butadiene block copolymer (Compound 13-2) results in non-transparent blends. Blends of Topas polymers with CD Polymer #24 also show a significant improvement in impact over unmodified Topas polymer (13-3). The impact improvement with CD Polymer #24 is close to the impact with G-1650, but with much better transparency.

TABLE 13

| Compounds with Topas 6015 | 13-1 | 13-2 | 13-3 |
|---|---|---|---|
| CD Polymer #24 | 15 | | |
| KG-1650 | | 15 | |

TABLE 13-continued

| Compounds with Topas 6015 | | 13-1 | 13-2 | 13-3 |
|---|---|---|---|---|
| Topas 6015 | | 85 | 85 | 100 |
| Irganox 1010 | | 0.2 | 0.2 | |
| Irganox PS 800 | | 0.8 | 0.8 | |
| Optical properties | | | | |
| Transparancy, % | | 91 | 54 | 93 |
| Haze, % (ASTM D-1003) | | 12 | 98 | 7 |
| Clarity, % (ASTM D-1746) | | 87 | 20 | 91 |
| Falling weight Impact properties (10 IM samples) (ISO 6603-2) | | | | |
| Average Impact Energy at failure | (J) | 7/40 | 9/29 | <1 |
| Mode of failure (D = Ductile; B = Brittle) | | 7 B/3 D | 8 B/2 D | B |

Example 14

Controlled distribution, styrenic block copolymers of the present invention offer processing advantages when used as shrink control modifiers for styrene monomer based thermoset applications. As shown in Table 14, controlled distribution Polymers #10, #12, and #19 afforded strikingly lower viscosity solutions in styrene monomer (15% wt polymer, 25° C.) than did linear triblock copolymer Comparative S-E/B-S Polymer I; this in spite of the controlled distribution polymers being essentially the same molecular weight as the comparative example. These data clearly show that the viscosity drops for the inventive polymers as the styrene content of the polymers was increased. Higher in styrene content polymers are preferred for their lower solution viscosity; they will be easier to handle, more freely flowing, in a commercial process.

In a like manner, polymers of the present invention, Polymers #5 and #11 (see Table 14), afforded lower in viscosity styrene solutions than a significantly smaller, linear triblock copolymer, Comparative S-E/B-S Polymer II. This is a further illustration of the advantage of the controlled distribution, hydrogenated, styrene-butadiene triblock copolymer over an analogous S-E/B-S material. Styrene solutions of the inventive polymers will be more freely flowing and the higher MW of the inventive polymers may improve the stability of a fully compounded SMC/BMC that contains them. Polymers #5 and #11 are preferred.

Similarly, controlled distribution polymers, Polymers #4, #14, and #15 gave-lower viscosity styrene solutions than a similar MW, linear triblock copolymer, Comparative S-E/B-S Polymer III. For this reason, these polymers will be easier to process in styrene thermoset applications than the conventional, linear triblock copolymer that does not have the controlled distribution of styrene and butadiene in the rubber segment.

Illustrative embodiment Polymer #26, when dissolved in styrene monomer gave a much lower viscosity solution than a similarly sized linear triblock copolymer, Comparative S-E/B-S Polymer IV. This is yet another example that shows the benefit of the controlled distribution polymers of the present invention.

In view of their viscosity performance in styrene monomer, it is expected that the controlled distribution polymers of the present invention would be good candidates for sheet molding compound (SMC) and bulk molding compound (BMC) applications. See, e.g., U.S. Pat. No. 4,400,478, which is herein incorporated by (reference, which discloses formulations and technology for employing block copolymers in SMC and BMC applications.

TABLE 14

| Solution Viscosities at 15 wt % in Styrene (25° C.) | | | |
|---|---|---|---|
| Material | PSC[1] | MW ($10^3$) | Viscosity (cPs)[2] |
| Comparative S-E/B-S Polymer I[3] | 31% | 188 | >>$10^6$ |
| Polymer #12 | 48% | 197 | 6,400 |
| Polymer #24 | 58% | 188 | 2,900 |
| Polymer #10 | 66% | 189 | 1,400 |
| Comparative S-E/B-S Polymer II[3] | 31% | 121 | 2,500 |
| Polymer #5 | 50% | 158 | 2,000 |
| Polymer #11 | 59% | 146 | 900 |
| Comparative S-E/B-S Polymer III[3] | 20% | 100 | 900 |
| Polymer #4 | 48% | 103 | 500 |
| Polymer #15 | 39% | 96 | 600 |
| Polymer #14 | 38% | 96 | 800 |
| Comparative S-E/B-S Polymer IV[3] | 30% | 47 | 200 |
| Polymer #26 | 47% | 50 | 100 |

[1]Polystyrene content of the block copolymer in percent weight.
[2]Brookfield viscosity measured with Spindle 21 at 100 rpm.
[3]Linear selectively hydrogenated styrene-butadiene-styrene triblock copolymer.

What is claimed:

1. An article selected from the group consisting of personal hygiene films and fibers, blown films for medical devices, extruded films, extruded tubes, extruded profiles, overmolded grips, airbags, steering wheels, toys, cap seals, automotive skins, thermal spray coatings, trays, and gloves, consisting essentially of at least one hydrogenated block copolymer and at least one other component selected from the group consisting of olefin polymers, styrene polymers, tackifying resins, polymer extending oils and engineering thermoplastic resins, wherein said hydrogenated block copolymer has at least one block A and at least one block B, and wherein:
   a. prior to hydrogenation each A block is a mono alkenyl arene homopolymer block and each B block is a controlled distribution copolymer block of at least one conjugated diene and at least one mono alkenyl arene;
   b. subsequent to hydrogenation about 0-10% of the arene double bonds have been reduced, and at least about 90% of the conjugated diene double bonds have been reduced;
   c. each A block having a number average molecular weight between about 3,000 and about 60,000 and each B block having a number average molecular weight between about 30,000 and about 300,000;
   d. each B block comprises terminal regions adjacent to the A blocks that are rich in conjugated diene units and a region not adjacent to the A blocks that is rich in mono alkenyl arene units;
   e. the total amount of mono alkenyl arene in the hydrogenated block copolymer is about 20 percent weight to about 80 percent weight; and
   f. the weight percent of mono alkenyl arene in each B block is between about 10 percent and about 75 percent.

2. The article according to claim 1 wherein said mono alkenyl arene is styrene and said conjugated diene is selected from the group consisting of isoprene and butadiene.

3. The article according to claim 2 wherein said conjugated diene is butadiene, and wherein about 20 to about 80 mol percent of the condensed butadiene units in block B have 1,2-configuration.

4. The article according to claim 3 wherein the styrene blockiness of block B is less than 40 percent.

5. The article according to claim 4 wherein the polymer is an ABA polymer and each block B has a center region with a minimum ratio of butadiene units to styrene units.

6. The article according to claim 2 wherein the weight percent of styrene in the B block is between about 10 percent and about 40 percent, and the styrene blockiness index of the block B is less than about 10 percent, said styrene blockiness index being defined to be the proportion of styrene units in the block B having two styrene neighbors on the polymer chain.

7. The article according to claim 1 wherein said hydrogenated block copolymer has the general configuration ABA, $(A-B)_n$, $(A-B-A)_n$, $(A-B)_nX$ or mixtures thereof where n is an integer between 2 and about 30, X is the residue of a coupling agent, each A block has a number average molecular weight of about 5,000 to about 20,000, each B block has a number average molecular weight of about 30,000 to about 100,000, and the total molecular weight is about 50,000 to about 140,000.

8. The article according to claim 7 comprising 100 parts by weight of said hydrogenated block copolymer and about 5 to about 50 parts by weight of a polymer extending oil.

9. The article according to claim 7 comprising 100 parts by weight of said hydrogenated block copolymer and about 5 to about 50 parts by weight of an olefin polymer selected from the group consisting of ethylene homopolymers, ethylene/alpha olefin copolymers, propylene homopolymers, propylene/alpha olefin copolymers, high impact polypropylene, and ethylene/vinyl acetate copolymers.

10. The article according to claim 9 also comprising about 5 to about 50 parts by weight of a tackifying resin.

11. The article according to claim 8 also comprising about 5 to about 40 parts by weight of a styrene polymer selected from the group consisting of crystal polystyrene, high impact polystyrene, syndiotactic polystyrene and acrylonitrile/butadiene/styrene terpolymer.

12. The article according to claim 7 comprising about 5 to about 95 percent by weight of said hydrogenated block copolymer and about 95 to about 5 percent by weight of an ethylene/vinyl aromatic copolymer or propylene/vinyl aromatic copolymer.

13. The article according to claim 12 wherein said ethylene/vinyl aromatic copolymer is a substantially random ethylene/styrene copolymer.

14. The article according to claim 1 wherein said hydrogenated block copolymer has the general configuration ABA, $(A-B)_n$, $(A-B-A)_n$, $(A-B)_nX$ or mixtures therof where n is an integer between 2 and about 30, X is the residue of a coupling agent, each A block has a number average molecular weight of about 10,000 to about 40,000, each B block has a number average molecular weight of about 60,000 to about 140,000, and the total molecular weight is about 140,000 to about 280,000.

15. The article according to claim 14 comprising 100 parts by weight of said hydrogenated block copolymer and about 10 to about 50 parts by weight of an olefin polymer selected from the group consisting of ethylene homopolymers, ethylene/alpha olefin copolymers, ethylene/vinyl aromatic copolymers, propylene homopolymers, propylene/alpha olefin copolymers, propylene/vinyl aromatic copolymers, high impact polypropylene, and ethylene/vinyl acetate copolymers.

16. The article according to claim 15 also comprising about 20 to about 150 parts by weight of a polymer extending oil.

17. The article according to claim 14 comprising about 5 to about 95 percent by weight of said hydrogenated block copolymer and about 95 to about 5 percent by weight of at least one polymer selected from the group consisting of poly(phenylene oxides), syndiotactic polystyrene, cyclic olefin copolymers and acrylonitrile/butadiene/styrene terpolymers.

18. The cap seal of claim 1, comprising 100 parts by weight of said hydrogenated block copolymer and about 50 to about 125 parts by weight of a polymer extending oil, 20 to 50 parts by weight of polypropylene and optionally 10 to 60 parts by weight silica.

19. The article according to claim 1 wherein the article is in the form of a film, sheet, coating, band, strip, profile, molding, foam, tape, fabric, thread, filament, ribbon, fiber, plurality of fibers or fibrous web.

20. The article according to claim 1 wherein said article is formed in a process selected from the group consisting of injection molding, over molding, dipping, extrusion, roto molding, slush molding, fiber spinning, film making or foaming.

21. The article according to claim 1 comprising about 5 to 20 percent weight of said hydrogenated block copolymer and about 80 to about 95 percent weight of an engineering thermoplastic resin.

22. The article according to claim 21 wherein said engineering thermoplastic resin is selected from the group consisting of thermoplastic polyester, thermoplastic polyurethane, poly(arylether), poly(aryl sulfone), polycarbonate, acrylic resins, acetal resin, polyamide, halogenated thermoplastic, cyclic olefin copolymers and nitrile barrier resin.

23. The article according to claim 1 wherein said hydrogenated block copolymer is a functionalized block copolymer.

24. The article according to claim 23 wherein said hydrogenated block copolymer has been grafted with an acid compound or its derivative.

25. The article according to claim 24 wherein said acid compound or its derivative is selected from the group consisting of maleic anhydride, maleic acid, fumaric acid, and its derivatives.

26. The article according to claim 24 wherein said acid compound or its derivative is maleic anhydride or maleic acid.

27. The article according to claim 26 containing 75 to 95 weight percent of an engineering thermoplastic selected from the group consisting of polyamides and polyurethanes and 5 to 25 weight percent of the functionalized block polymer.

28. The article according to claim 1 comprising about 5 to 40 percent weight of said hydrogenated block copolymer and about 60 to about 95 percent weight of a polystyrene homopolymer or copolymer.

29. The article according to claim 1 wherein said hydrogenated block copolymer has the general configuration A-B-A, $(A-B)_n$, $(A-B)_n$-A, $(A-B)_nX$, or mixtures thereof where n is an integer from 2 to about 30 and X is coupling agent residue.

30. The article according to claim 29 wherein said A block is a polystyrene block, said B block prior to hydrogenation is a controlled distribution copolymer block of 1,3-butadiene and styrene, wherein about 20 to about 80 mol percent of the condensed butadiene units in block B have 1,2-configuration, and wherein the styrene blockiness of block B is less than 40 percent.

31. The article according to claim 30 comprising said hydrogenated block copolymer and a cyclic olefin copolymer.

32. The article according to claim 31 wherein said cyclic olefin copolymer is a norbornene/ethylene copolymer.

33. The article according to claim 31 comprising about 5 to about 95 weight percent hydrogenated block copolymer and about 95 to about 5 weight percent cyclic olefin copolymer.

34. The article according to claim 31 comprising said hydrogenated block copolymer and at least one olefin polymer.

35. The article according to claim 34 wherein said olefin polymer is selected from the group consisting of ethylene homopolymers, ethylene/alpha olefin copolymers, ethylene/vinyl aromatic copolymers, propylene homopolymers, propylene/alpha olefin copolymers, propylene/vinyl aromatic copolymers, high impact polypropylene, and ethylene/vinyl acetate copolymers.

36. The article according to claim 30 comprising said hydrogenated block copolymer and at least one styrene polymer.

37. The article according to claim 36 wherein said styrene polymer is selected from the group consisting of crystal polystyrene, high impact polystyrene, syndiotactic polystyrene and acrylonitrile/butadiene/styrene terpolymer.

38. The article according to claim 30 comprising said hydrogenated block copolymer and a tackifying resin.

39. The article according to claim 30 also comprising a polystyrene block compatible resin.

40. The article according to claim 30 comprising said hydrogenated block copolymer and an engineering thermoplastic resin.

41. The article according to claim 40 wherein said engineering thermoplastic resin is selected from the group consisting of thermoplastic polyesters, thermoplastic polyurethanes, poly(aryl ethers), poly(aryl sulfones), polycarbonates, acetal resins, polyamides, halogenated thermoplastics, nitrile barrier resins, cyclic olefin copolymers and poly(methyl methacrylates).

42. The article according to claim 30 comprising said hydrogenated block copolymer and an S-EB-S block copolymer.

43. The article according to claim 1 wherein said hydrogenated block copolymer has the general configuration A-B-A, (A-B)$_n$, (A-B)$_n$-A, (A-B)$_n$X, or mixtures thereof where n is an integer from 2 to about 30 and X is coupling agent residue.

44. The tray according to claim 1 comprising:
   a. an unsaturated, crosslinkable thermosetting resin;
   b. an ethylenically unsaturated monomer;
   c. an additive selected from the group consisting of reinforcing agents, fillers and mixtures thereof; and
   d. said block copolymer.

45. The composition according to claim 44 wherein said thermosetting resin is a polyester resin.

46. The composition according to claim 44 wherein said unsaturated monomer is styrene.

47. The article according to claim 1 comprising 1 to 99 percent weight of said hydrogenated block copolymer and 99 to 1 percent weight of said other component.

48. An article selected from the group consisting of personal hygiene films and fibers, blown films for medical devices, extruded films, extruded tubes, extruded profiles, overmolded grips, airbags, steering wheels, toys, cap seals, automotive skins, trays, and gloves consisting essentially of at least one hydrogenated block copolymer and at least one other component selected from the group consisting of olefin polymers, styrene polymers, tackifying resins, polymer extending oils and engineering thermoplastic resins, wherein said hydrogenated block copolymer has at least one block A and at least one block B, and wherein:
   a. prior to hydrogenation each A block is a mono alkenyl arene homopolymer block and each B block is a controlled distribution copolymer block of at least one conjugated diene and at least one mono alkenyl arene;
   b. subsequent to hydrogenation about 0-10% of the arene double bonds have been reduced, and at least about 90% of the conjugated diene double bonds have been reduced;
   c. each A block having a number average molecular weight between about 3,000 and about 60,000 and each B block having a number average molecular weight between about 30,000 and about 300,000;
   d. each B block comprises terminal regions adjacent to the A blocks that are rich in conjugated diene units and a region not adjacent to the A blocks that is rich in mono alkenyl arene units;
   e. the total amount of mono alkenyl arene in the hydrogenated block copolymer is about 20 percent weight to about 80 percent weight
   f. the weight ratio of conjugated diene to mono alkenyl arene in the B block is between about 5:1 and about 1:2.

49. The article according to claim 48 wherein said mono alkenyl arene is styrene and said conjugated diene is selected from the group consisting of isoprene and butadiene.

50. The article according to claim 49 wherein said conjugated diene is butadiene, and wherein about 20 to about 80 mol percent of the condensed butadiene units in block B have 1,2-configuration.

51. The article according to claim 50 wherein the styrene blockiness of block B is less than 40 percent.

52. The article according to claim 51 wherein the polymer is an ABA polymer and each block B has a center region with a minimum ratio of butadiene unites to styrene units.

53. The article according to claim 49 wherein the weight percent of styrene in the B block is between about 10 percent and about 40 percent, and the styrene blockiness index of the block B is less than about 10 percent, said styrene blockiness index being defined to be the proportion of styrene units in the block B having two styrene neighbors on the polymer chain.

54. The article according to claim 48 wherein said hydrogenated block copolymer has the general configuration ABA, (A-B)$_n$, (A-B-A)$_n$, (A-B)$_n$X or mixtures thereof where n is an integer between 2 and about 30, X is the residue of a coupling agent, each A block has a number average molecular weight of about 5,000 to about 20,000, each B block has a number average molecular weight of about 30,000 to about 100,000, and the total molecular width is bout 50,000 to about 140,000.

55. The article according to claim 48 wherein said hydrogenated block copolymer has the general configuration ABA, (A-B)$_n$, (A-B-A)$_n$, (A-B)$_n$X or mixtures thereof where n is an integer between 2 and about 30, X is the residue of a coupling agent, each A block has a number average molecular weight of about 10,000 to about 40,000, each B block has a number average molecular weight of about 60,000 to about 140,000, and the total molecular weight is about 140,000 to about 280,000.

* * * * *

UNITED STATES PATENT AND TRADEMARK OFFICE
CERTIFICATE OF CORRECTION

PATENT NO. : 7,267,855 B2  Page 1 of 1
APPLICATION NO. : 10/359907
DATED : September 11, 2007
INVENTOR(S) : Dale L. Handlin, Jr. et al.

It is certified that error appears in the above-identified patent and that said Letters Patent is hereby corrected as shown below:

Claim 31, line 2, col. 32, line 66 delete "olef in" and insert --olefin--.
Claim 48, lines 7 and 8, col. 33, line 67 - col. 34, line 1 delete "olef in" and insert --olefin--.
Claim 52, line 3, col. 34, line 39 delete "unites" and insert --unit--.
Claim 54, lines 7 and 8, col. 34, line 54-55 delete "30, 000" and insert --30,000--.
Claim 54 line 8, col. 34, line 55 delete "bout" and insert --about--.

Signed and Sealed this

Twenty-seventh Day of November, 2007

JON W. DUDAS
*Director of the United States Patent and Trademark Office*